April 26, 1960
L. D. MASSER
2,934,351
LOAD APPORTIONING TANDEM SUSPENSION
STRUCTURE FOR VEHICLES
Filed Feb. 17, 1958
2 Sheets-Sheet 1
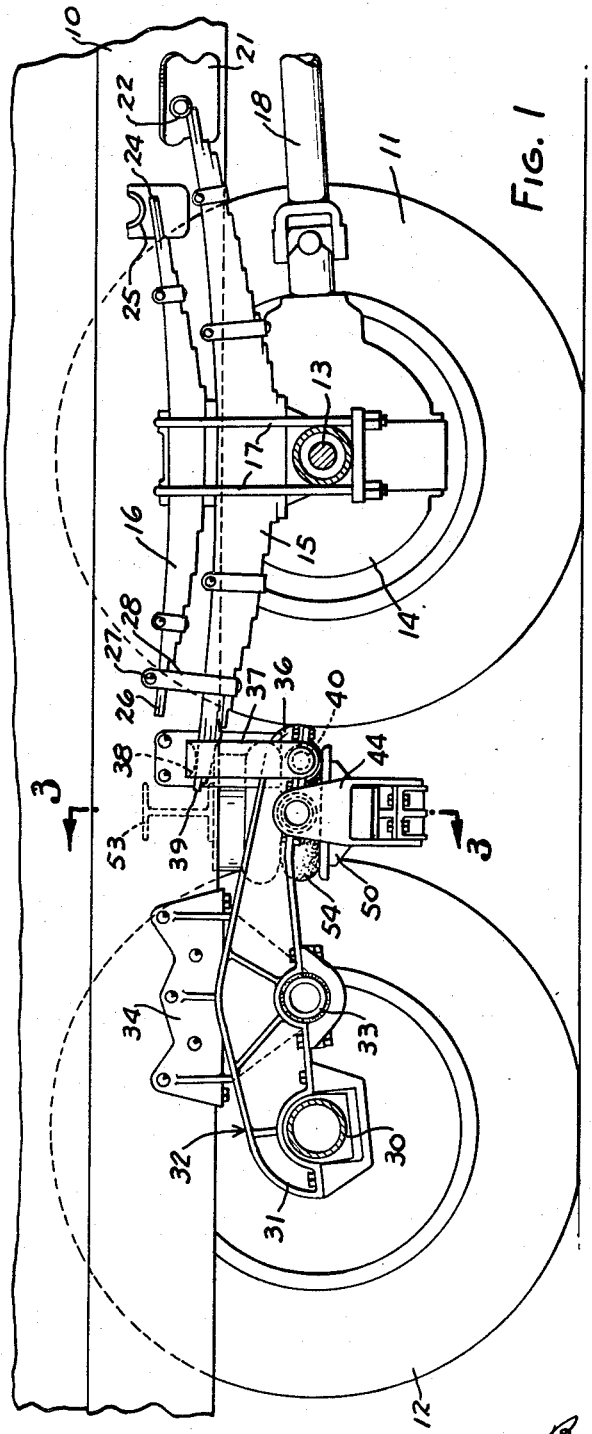
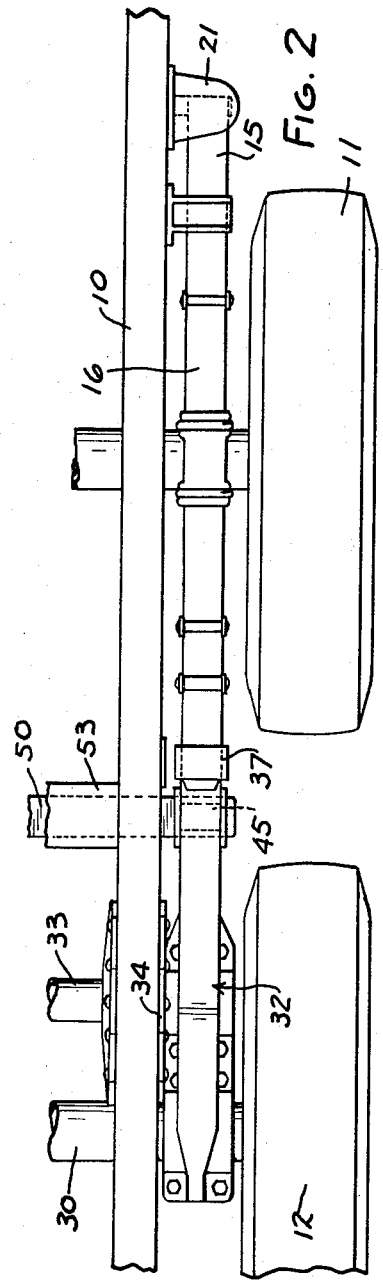
INVENTOR.
LLOYD D. MASSER
BY
*Barnes, Kisselle, Raisch & Choate*
ATTORNEYS

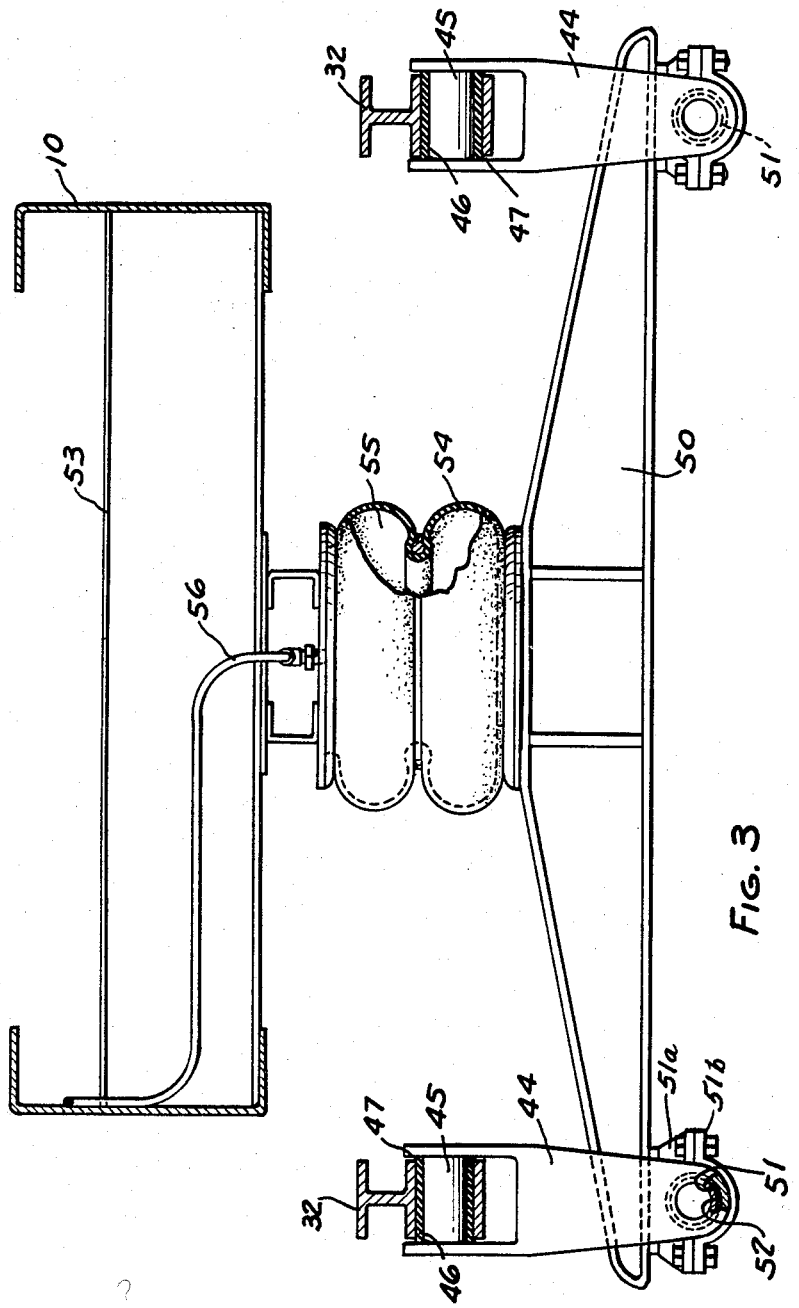

United States Patent Office 2,934,351
Patented Apr. 26, 1960

2,934,351

LOAD APPORTIONING TANDEM SUSPENSION STRUCTURE FOR VEHICLES

Lloyd D. Masser, Muskegon, Mich., assignor to Neway Equipment Company, Muskegon, Mich., a corporation of Michigan Application February 17, 1958, Serial No. 715,721

8 Claims. (Cl. 280—104.5)

The suspension structure of this invention is applicable to vehicles wherein the frame is supported by two sets of wheels in tandem arrangement, particularly where one set is suspended through springs and the other set is suspended through walking beams. This disclosure is made with reference to such an arrangement in which the spring suspended axle is live or driven and the walking beam suspended axle is dead and is only provided to share the load on the vehicle frame. The dead axle is sometimes referred to as a tag axle.

Tandem suspensions of this type have the objectionable characteristic that shock from the wheels is transmitted directly from the walking beams to the vehicle frame without interposed springs, making the vehicle rough riding and tiring on the operator. Moreover, since the tag axle bears part of the load and is not driven, traction at the driven set of wheels is inadequate in some situations.

An object of this invention is to provide a simple, inexpensive tandem axle structure for selectively shifting load between the sets of wheels whereby, in accordance with the requirements of different situations, to relieve load on the tag axle for providing a relatively soft ride or providing greater traction, or to distribute the load generally uniformly between the axles for carrying a maximum load.

The invention is carried out generally by interposing a pneumatically expansible bag or bellows between portions of the vehicle frame and portions of the walking beams for rocking the walking beams and raising or lowering the tag axle to vary the proportions of the load carried by the axles. One form of the invention is shown in the accompanying drawings.

Figure 1 is a generally elevational view of a portion of a vehicle having a tandem axle suspension embodying the present invention.

Figure 2 is a fragmentary plan view illustrating structure at one side of the vehicle.

Figure 3 is an enlarged, generally sectional view on line 3—3 of Figure 1 with parts of the vehicle omitted and parts broken away to illustrate the structure of this invention.

Shown in the drawings is a portion of a vehicle having a frame 10 with a set of ground engaging wheels 11 and a set of ground engaging wheels 12 suspended therefrom in tandem arrangement. Wheels 11 are mounted on an axle 13 supported in a housing 14 secured to a leaf spring 15 and an auxiliary leaf spring 16 by U bolts 17. Axle 13 is shown as being a live axle driven by a propeller shaft 18 through suitable gearing in axle housing 14. The forward end of spring 15 is fixed on frame 10 through a bracket 21 as at 22. Under lightly loaded conditions of the vehicle, the forward end 24 of auxiliary spring 16 is spaced from an element 25 secured to frame 10 and the rearward end 26 of this spring is similarly spaced from an element 27 on a tie member 28 fixed to main spring 15. Auxiliary spring 16 comes into use only when spring 15 is flexed under load on frame 10 so that elements 25 and 27 engage spring ends 24 and 26 respectively.

Wheels 12 are mounted on a tag axle 30, shown as being dead or undriven, extending trasversely of frame 10 and secured to the rear end portions 31 of walking beams 32 rockably supported on a trunnion or shaft 33 secured to frame 10 through brackets 34 at each side of the frame. The walking beams are arranged to rock relatively to frame 10 in generally vertical planes. The forward end portion 36 of each walking beam is supported by an inverted U-shaped strap 37 whose upper end or base portion has a fillet 38 which bears on the rear end portion 39 of spring 15. The lower ends or leg portions of strap 37 are secured to forward end 36 of the walking beam through pintles 40. The connections between the walking beams and tag axle 30, trunnion 33 and pintles 40 are preferably rubber bushed to permit relative tilting of the parts when vehicle 10 traverses uneven ground.

A stirrup 44 depends from each walking beam 32 adjacent the forward ends of the walking beams. Each stirrup is supported by a pintle arrangement as at 45 so that it can swing relatively to the walking beam as the walking beam rocks about its pivotal mounting. Pintles 45 are preferably rubber bushed as at 46 and clearance is provided between walking beams 32 and the stirrup members as at 47 to enable the stirrups to rock transversely of the walking beams. A transverse beam 50 is supported by stirrups 44 through pin and socket joints which permit relative rocking of the beam and stirrups. Each of these joints includes a pin 51 shown as being hollow rockably contained between bolted-together members 51a and 51b on beam 50. A rubber bushing 52 is preferably interposed between pin 50 and its supporting members.

Beam 50 is vertically spaced below a transverse member 53 of frame 10. A vertically extensible device 54 is interposed between beam 50 and frame member 53. In the form of the invention illustrated, device 54 comprises a bag or bellows defining a chamber 55 for containing air under pressure and formed of a flexible material such as rubber or an elastomeric material. A conduit 56 connects into bag 54 and is adapted to be connected to a source of air under pressure such as the pneumatic system of a vehicle equipped with air brakes. The vertical distance between beam 50 and frame member 53 may be varied by regulating the pressure of the air in bag 54.

In use, load is transmitted from vehicle frame 10 to wheels 11 through spring 15 or springs 15 and 16 and load is transmitted to wheels 12 through brackets 34, trunnion 33 and walking beams 32. The forward end 36 of each walking beam is supported by the rear end of spring 15. During operation of the vehicle, when wheels 12 ride over bumps in a road or other surface being traversed, a certain amount of the shock on tag axle 30 is transmitted directly to frame 10 through trunnion 33 and brackets 34. This shock is not softened by any interposed springs.

When the vehicle is light, that is when it is carrying little or no pay load, it is frequently unnecessary for wheels 12 to carry any appreciable amount of the load. Under these circumstances, the vehicle operator, through suitable controls, introduces air under pressure into bag 54 for forcing beam 50 downwardly relatively to vehicle frame 10. Stirrups 44, the forward ends 36 of the walking beams, and supporting straps 37 therefor are forced downwardly against the action of spring 15 and this rocks the walking beams so that tag axle 30 and wheels 12 are elevated relative to the frame. This diminishes the load on rear wheels 12 and thereby decreases the shock transmitted from wheels 12 directly to frame 10. The vehicle is thereby made much easier riding and the easier ride decreases fatigue of the vehicle operator. Wheels 12 may be completely lifted off of the ground in some situations.

When the vehicle is loaded and it is desirable for wheels 12 to assume a portion of the load, pressure in bag 54 is relived, permitting it to collapse at least partially. Leaf spring 15 is thereby relieved and it, through straps 37, elevates the forward ends 36 of the walking beams, thereby rocking the walking beams and returning tag axle 30 to a downward position so that the proportion of the vehicle load on wheels 12 is increased.

In some situations where the vehicle is heavily loaded, it may be desirable to increase the load on driven wheels 11 in order to obtain greater traction such as where the vehicle is being driven through mud or over a slippery surface. In this event, the pressure in bag 54 is increased to rock walking beams 32 in the manner described for elevating tag axles 30 and diminishing the proportion of the load on wheels 12. The proportion of the load on wheels 11 is increased commensurately for providing the added traction. To redistribute the vehicle load more evenly on wheels 11 and 12, pressure in bag 54 is decreased and wheels 12 are rocked downwardly in the manner described under the action of leaf spring 15.

The rubber bushings at the various connections between straps 37, the walking beams, stirrups 44, and beam 50 permit a certain amount of universal motion between these various parts to accommodate their tendency to rock relatively to each other when the vehicle traverses uneven ground. Beam 50 may tilt relative to frame member 53 during these rocking movements. Bag 54 has a flexible construction and thus accommodates such tilting of beam 50 without injury. The air pressure in bag 54 can be regulated to provide partial or complete shifting of load from wheels 12 to wheels 11. Experimentation has shown that in a vehicle carrying an ordinary load, partial pressure can be kept in bag 54 to soften the ride of the vehicle without objectionably affecting the loading of the two sets of wheels. In the event that air pressure to bag 54 should fail completely for some reason, the vehicle can be operated in the ordinary manner as a conventional vehicle.

As will be understood by those versed in the art the term "walking beam" is broad enough to include spring stacks having walking beam mounting and function.

I claim:

1. In a vehicle having a frame and a plurality of sets of ground engaging wheels in tandem load-bearing relation to said frame, suspension structure comprising, spring means and transverse axle means securing one set of wheels to said frame, a walking beam adjacent each side of said frame, transverse axle means associated with the other set of wheels secured to portions of said walking beams, means providing vertical support for other portions of said walking beams, each walking beam having an intermediate portion pivotally mounted in load-bearing relation to said frame so that it can rock in a generally vertical plane, a beam member, mounting means mounting said beam member on said other portions of said walking beams so that said beam member extends transversely between said walking beams and in vertically spaced relation to force-receiving means on said frame, said mounting means including joints facilitating rocking movement of said beam member relative to said frame and walking beams, load shifting means interposed between said beam member and said force-receiving means on said frame, said load shifting means being extensible in a generally vertically direction for forcing said beam member and said other portions of said walking beams downwardly whereby to rock said walking beams about their pivotal mounts for changing the vertical position of said other set of wheels relative to said frame to shift load between said sets of wheels.

2. The structure defined in claim 1 wherein said load shifting means is extensible responsively to fluid pressure introduced thereto.

3. The structure defined in claim 1 wherein said load shifting means includes a flexible walled chamber for containing air under pressure, said container being extensible responsively to changes of pneumatic pressure therein.

4. In a vehicle having a frame and a plurality of sets of ground engaging wheels in tandem load-bearing relation to said frame, suspension structure comprising, spring means and transverse axle means securing one set of wheels to said frame, a walking beam adjacent each side of said frame, transverse axle means associated with the other set of wheels secured to portions of said walking beams, means providing vertical support for other portions of said walking beams, each walking beam having an intermediate portion pivotally mounted in load-bearing relation to said frame so that it can rock in a generally vertical plane, a stirrup secured to said other portion of each walking beam at a location displaced longitudinally of said frame from said transverse axle means and the pivotal mounts of said walking beams, each stirrup being rockable about an axis generally transverse to said walking beams, a beam member supported by said stirrups in vertically spaced relation to force-receiving means on said frame, said beam member being rockable relative to said stirrups in a direction transverse to said stirrups whereby to accommodate unlike rocking motion of said walking beams when said vehicle traverses uneven ground, load shifting means interposed between said beam member and said force-receiving means on said frame, said load shifting means being extensible in a generally vertical direction for forcing said beam member and said other portions of said walking beams downwardly for changing the vertical position of said other set of wheels relative to said frame whereby to shift load between said sets of wheels.

5. In a vehicle having a frame and a plurality of sets of ground engaging wheels in tandem load-bearing relation to said frame, suspension structure comprising, spring means and transverse axle means securing one set of wheels to said frame, a walking beam pivotally mounted adjacent each side of said frame, transverse axle means associated with the other set of wheels secured to portions of said walking beams, means providing vertical support for other portions of said walking beams, each walking beam having an intermediate portion pivotally mounted in load-bearing relation to said frame so that it can rock in a generally vertical plane, a stirrup secured to said other portion of each walking beam through a pivot whose axis is generally transverse to said walking beams, a beam member, said beam member having end portions supportingly secured to said stirrups through pivots whose axes are transverse to the axes of the pivots between said stirrups and walking beams, said beam member extending transversely between said walking beams and being spaced vertically from force-receiving means on said frame, said pivots facilitating rocking movement of said beam member relative to said walking beams and frame and securing said beam member against significant linear shifting in a direction transverse to said frame, load shifting means engaging said beam member and said force-receiving means on said frame, said load shifting means being extensible in a generally vertical direction for forcing said beam member and said other portions of said walking beams downwardly for changing the vertical position of said other set of wheels relative to said frame, whereby to shift load between said sets of wheels.

6. In a vehicle having a frame and a plurality of sets of ground engaging wheels mounted on transverse axles in turn suspended from said frame through a spring member and walking beam member adjacent each side of the vehicle, a connection vertically swingably mounting a portion of each walking beam member intermediate its ends in load bearing relation to said frame, two of said members, one adjacent each side of the vehicle, cooperating to carry means forming a transverse beam vertically spaced from force-receiving means on said frame and displaced longitudinally from said axles and from said connections of said walking beam members to said frame, said beam being movable in a generally vertical direction relative to said frame, at least one of said axles and the set of ground engaging wheels mounted thereon being shiftable in a generally vertical direction relative to said frame responsive to movement of said beam relative to said force-receiving means on said frame, and load shifting means engaging said beam and force-receiving means on said frame, said load shifting means being extensible in a generally vertical direction to vary the relative spacing of said beam and force-receiving means on said frame, whereby to shift load between said sets of wheels.

7. In a vehicle having a frame and a plurality of sets of ground engaging wheels suspended in load bearing tandem relation therefrom through transverse axle means and articulated spring members and vertically swingably mounted walking beam members, load transmitting means extending transversely between articulated members adjacent opposite sides of the vehicle and being connected thereto at locations spaced longitudinally both from said tranvserse axle means and the mounts of said walking beams, said load transmitting means being vertically spaced from force-receiving means on said frame, load shifting means operably interposed between said load transmitting means and force-receiving means on said frame, said load shifting means being extensible in a generally vertical direction for shifting said load transmitting means relative to said force-receiving means on said frame and rocking said walking beams about their mounts for changing the relative vertical positions of said sets of wheels, whereby to shift load between said sets of wheels.

8. In a vehicle having a frame and a plurality of sets of ground engaging wheels suspended in load bearing tandem relation therefrom through transverse axle means and articulated spring members and vertically swingably mounted walking beams members, load transmitting means extending transversely between articulated members adjacent opposite sides of the vehicle and being connected thereto at locations spaced longitudinally both from said transverse axle means and the mounts of said walking beams, said load transmitting means being vertically spaced from force-receiving means on said frame, load shifting means operably interposed between said load transmitting means and force-receiving means on said frame, said load shifting means being extensible in a generally vertical direction for shifting said load transmitting means relative to said force-receiving means on said frame and rocking said walking beams about their mounts for changing the relative vertical positions of said sets of wheels, whereby to shift load between said sets of wheels, the connections between said load transmitting means and articulated members including articulable joints so that said walking beams can rock with unlike movement relative to said load transmitting means when the vehicle traverses uneven ground.

References Cited in the file of this patent

UNITED STATES PATENTS

| | | |
|---|---|---|
| 2,599,043 | Bissell | June 3, 1952 |
| 2,659,446 | Willock | Nov. 17, 1953 |
| 2,777,529 | Harbers | Jan. 15, 1957 |
| 2,864,453 | La Belle | Dec. 16, 1958 |

FOREIGN PATENTS

| | | |
|---|---|---|
| 111,646 | Sweden | Aug. 29, 1944 |